US008674708B2

(12) United States Patent
Wuerstlein et al.

(10) Patent No.: US 8,674,708 B2
(45) Date of Patent: Mar. 18, 2014

(54) SENSOR DEVICE FOR DETERMINING THE DEVIATION OF A HEAD SUPPORT POSITION FROM A TARGET POSITION

(75) Inventors: Holger Wuerstlein, Zeil am Main (DE); Tobias Hofmann, Leinach (DE)

(73) Assignee: Brose Fahrzeugteile GmbH & Co., KG, Hallstadt, Hallstadt (DE)

( * ) Notice: Subject to any disclaimer, the term of this patent is extended or adjusted under 35 U.S.C. 154(b) by 395 days.

(21) Appl. No.: 13/213,523

(22) Filed: Aug. 19, 2011

(65) Prior Publication Data

US 2012/0043975 A1 Feb. 23, 2012

Related U.S. Application Data

(63) Continuation of application No. PCT/EP2010/000399, filed on Jan. 23, 2010.

(30) Foreign Application Priority Data

Feb. 19, 2009 (DE) ......................... 10 2009 009 741

(51) Int. Cl.
*G01R 27/26* (2006.01)

(52) U.S. Cl.
USPC ............................ 324/671; 324/662; 324/686

(58) Field of Classification Search
USPC .......................................... 324/671, 662, 686
See application file for complete search history.

(56) References Cited

U.S. PATENT DOCUMENTS 6,402,195 B1 6/2002 Eisenmann et al.
7,853,381 B2 * 12/2010 Iyoda ............................. 701/45
7,967,377 B2 6/2011 Truckenbrodt et al.
2003/0090133 A1 * 5/2003 Nathan et al. ............. 297/217.3

FOREIGN PATENT DOCUMENTS

DE 199 16 804 C1 8/2000
EP 1 857 318 A2 11/2007
FR 2 866 846 A1 9/2005
FR 2 884 775 A1 10/2006
JP 1011512 A 1/1989
WO WO 2009/028532 A1 3/2009

* cited by examiner

*Primary Examiner* — Amy He
(74) *Attorney, Agent, or Firm* — Muncy, Geissler, Olds & Lowe, P.C.

(57) ABSTRACT

A sensor device for determining the deviation of the position of a head support of a motor vehicle seat from a target position is provided that includes a capacitative proximity sensor that can be integrated in a head support, having two transmitting electrodes disposed at a vertical distance from each other and a common receiving electrode. The sensor device further includes a control unit that can be set up for actuating the transmitting electrodes for transmitting an alternating electric field, determining a dimension for the vertical and horizontal deviation of the head support position from a target position relative to the position of a head of a vehicle occupant from received electrical signals captured by the receiving electrode and information about the capacitance formed between each of the transmitting electrodes and the receiving electrode determining the dimension for the vertical deviation of the head support position using a difference between the received signals associated with the two transmitting electrodes or parameters derived therefrom, and determining the dimension for the horizontal deviation of the head support position using the sum of the received signals associated with the two transmitting electrodes or parameters derived therefrom.

3 Claims, 1 Drawing Sheet

SENSOR DEVICE FOR DETERMINING THE DEVIATION OF A HEAD SUPPORT POSITION FROM A TARGET POSITION

This nonprovisional application is a continuation of International Application No. PCT/EP2010/000399, which was filed on Jan. 23, 2010, and which claims priority to German Patent Application No. DE 10 2009 009 741.4, which was filed in Germany on Feb. 19, 2009, and which are both herein incorporated by reference.

BACKGROUND OF THE INVENTION

1. Field of the Invention

The invention relates to a sensor device for determining the deviation of the position of a head support of a motor vehicle seat from a target position.

2. Description of the Background Art

In a motor vehicle seat, head supports are used to support the head of a vehicle occupant using the seat in the event of a crash and to thereby prevent the cervical spine from snapping backward. However, the full extent of the increased safety achieved by the head support is realized only if the head support is adjusted to the correct height with regard to the vertical head position so that, in the event of a crash, the head largely strikes the center of the head support provided for this purpose. An incorrectly adjusted head support, on the other hand, may cause injuries in the neck and head area in the event of a crash. To minimize the risk of head injury, for example a concussion when the head strikes the head support, the head support should also be situated as close as possible to the vehicle occupant's head in the horizontal direction and yet enable unobstructed head movement.

To correctly position a head support, the head support is usually adjustable in the vertical direction and, to a certain extent, also in a horizontal direction with regard to the seat backrest. In a high-end motor vehicle seat, the adjustment of the head support is frequently motor-driven.

To avoid incorrect positioning of the head support, a modern head support adjusting device is sometimes assigned a sensor device which detects the head position of a vehicle occupant with regard to the associated head support. For example, a head support adjusting device known from EP 1 857 318 A2, which corresponds to U.S. Pat. No. 7,967,377, is assigned a sensor device in the form of a capacitive proximity sensor which is integrated into the head support. The proximity sensor includes three electrodes which are disposed at a distance from each other in the vertical direction on the front of the head support. The two outer electrodes are used as transmitting electrodes for transmitting an alternating electric field in a spatial area situated in front of the head support. The middle electrode is used as a common receiving electrode for measuring the capacitance formed between each of the transmitting electrodes and the receiving electrode. The known adjusting device utilizes the physical effect that the capacitance of the electrode arrangement varies in a characteristic manner when the head is present in the alternating electric field. The deviation of the head support position from a predetermined vertical target position with regard to the head of the vehicle occupant is determined by comparing the capacitance values assigned to each of the two transmitting electrodes. The head support position at which these capacitance values are identical is detected as the target position for the head support.

Similar sensor devices which have a capacitive proximity sensor which includes three electrodes for detecting the head position relative to a head support are furthermore also known from FR 2 884 775 A1 and DE 199 16 804 C1, which corresponds to U.S. Pat. No. 6,402,195.

SUMMARY OF THE INVENTION

It is therefore an object of the invention to provide a sensor device for a head support which is improved over the prior art.

In an embodiment, the sensor device provided for ascertaining the deviation of a position of a head support of a motor vehicle seat from a target position includes, according to an embodiment of the invention, a capacitive proximity sensor which is integrated into the head support or is provided for integration into the head support, this proximity sensor including two transmitting electrodes which are disposed at a vertical distance from each other as well as a common receiving electrode, this receiving electrode being preferably disposed approximately in the middle between the two transmitting electrodes. The sensor device furthermore includes a control unit. The control unit is configured—using circuitry or programming—to actuate the transmitting electrodes for transmitting an alternating electric field. The control unit is furthermore configured to evaluate electric receive signals, which are detected by the receiving electrode and which each contain an item of information about the capacitance formed between one of the transmitting electrodes and the common receiving electrode, and, during the course of this evaluation, to determine a dimension for the vertical and horizontal deviations of a head support position from a target position provided with regard to the position of the head of a vehicle occupant.

The control unit can furthermore be configured to determine the dimension for the vertical deviation of the head support position on the basis of a difference between the receive signals assigned to each of the two transmitting electrodes and to determine the dimension for the horizontal deviation of the head support position on the basis of a sum of these receive signals. Alternatively, the control unit may also be configured, according to the invention, to use variables derived from the receive signals instead of the receive signals themselves in forming the sum or difference. In an advantageous embodiment of the invention, the control unit thus ascertains the dimension for the vertical deviation of the head support position by forming a difference between two capacitance values derived from the receive signals, each of which is assigned to one of the two transmitting electrodes. The control unit furthermore preferably determines the dimension for the horizontal deviation of the head support position by forming a sum of these two capacitance values.

The sum and/or difference is/are formed either using circuitry on the hardware level, for example with the aid of (in particular analog) differentiating or adding circuits or using programming, i.e., on the software level using numeric addition or differentiation of digitized measured variables. By taking into account the sum measurement, an increased sensor range, in particular, is achieved in adjusting the horizontal head support position.

The invention may also be applied in an equivalent manner to a sensor device whose capacitive proximity sensor comprises two receiving electrodes disposed at a vertical distance from each other and one common transmitting electrode which is disposed—in particular in the middle—between these two receiving electrodes. In this case, the control unit is configured to activate the common transmitting electrode for transmitting the alternating electric field and to evaluate the electric receive signals detected by each of the two receiving electrodes in the manner described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
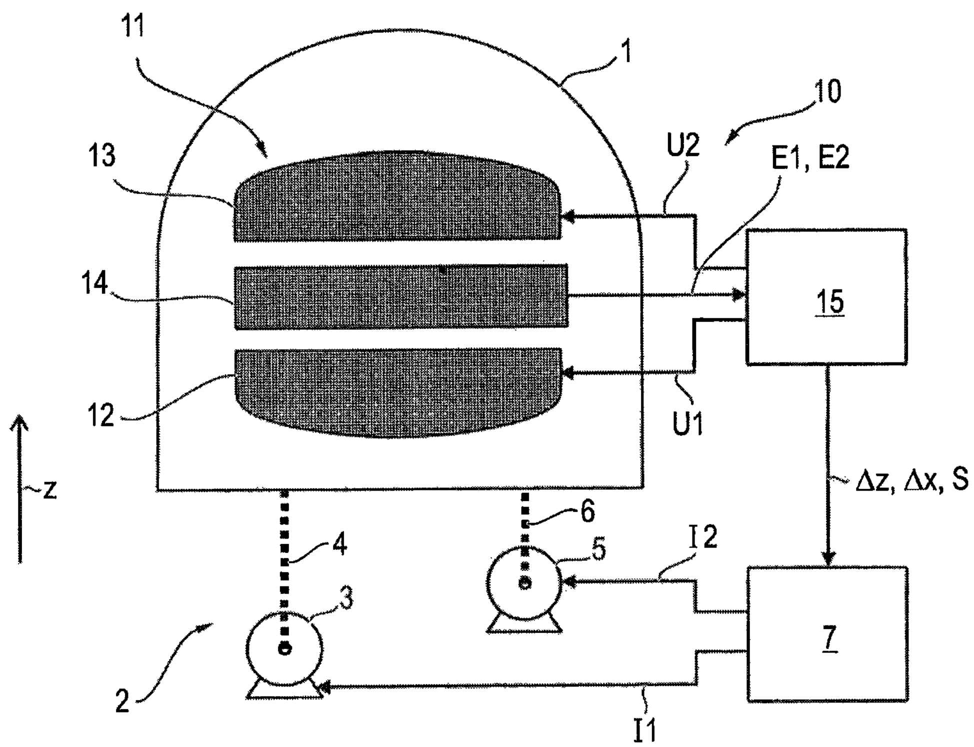
FIG. 1 shows a schematic block diagram of a head support having an assigned adjusting device as well as a sensor device for ascertaining the deviation of the head support position from a target position.

Corresponding parts and variables are always provided with the same reference numerals in all figures.

Figure 2:
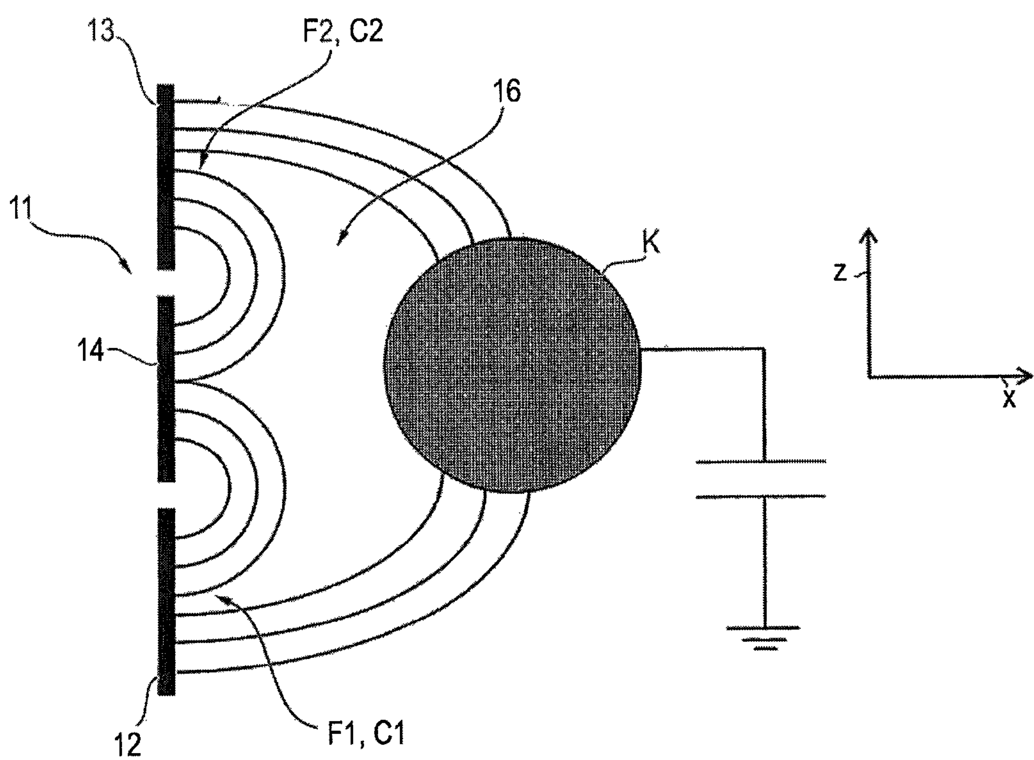
FIG. 2 shows a schematic side view of a capacitive proximity sensor of the sensor device, including a head of a vehicle occupant situated in front of the proximity switch, as well as the field curve of an electric field emitted by the proximity switch.

FIG. 1 shows a rough schematic representation of a head support 1 of a motor vehicle seat (not illustrated in greater detail). Head support 1 is attached in the usual manner at the upper end of the backrest of the motor vehicle seat, and it is reversibly adjustable relative to the backrest in a vertical direction z and reversibly adjustable, in turn, in a horizontal direction x independently thereof (FIG. 2).

When the motor vehicle seat is properly installed in a motor vehicle, vertical direction z is situated at least largely perpendicularly in relation to the surrounding space. However, the vertical direction may also be slightly inclined in relation to the spatial vertical. When the motor vehicle seat is installed, horizontal direction x is oriented approximately parallel to the longitudinal axis of the motor vehicle and thus parallel to the direction of travel. However, horizontal direction x may be inclined slightly relative to the spatial horizontal. In particular, vertical direction z and horizontal direction x are positioned approximately perpendicularly to each other. In the representation according to FIG. 1, horizontal direction x is situated perpendicularly to the plane of projection.

Head support 1 is adjustable by a motor in both vertical direction z and in horizontal direction x with the aid of an assigned adjusting device 2. Adjusting device 2 includes a first servomotor 3 which is connected to head support 1 via an assigned adjusting mechanism 4 for vertical adjustment of head support 1. For horizontal adjustment of head support 1, adjusting device 2 includes a further servomotor 5 which, in turn, acts upon head support 1 via an assigned adjusting mechanism 6. Servomotor 3 is disposed, in particular, in the backrest of the motor vehicle seat and, with the aid of adjusting mechanism 4, acts upon crosspieces that are used to anchor head support 1 in the backrest in the usual manner. Servomotor 5, on the other hand, is preferably integrated into head support 1, a forward-facing front part of head support 1 being horizontally adjustable relative to a back part of head support 1 anchored on the backrest with the aid of assigned adjusting mechanism 6.

To actuate servomotors 3 and 5, adjusting device 2 includes an assigned motor control unit 7, which is largely formed, for example, by a microcontroller and control software implemented therein, and which actuates servomotors 3 and 5 by outputting a corresponding control current I1 and I2, respectively.

If the seat is occupied by a vehicle user, head support 1 assigned to this seat must be properly adjusted to a vertical target position in which the eye-ear line of head K (FIG. 2) of the seat user is situated approximately at the same height as the surface center of head support 1. With regard to its horizontal adjustment path, head support 1 must be properly adjusted to a horizontal target position in which the distance between head support 1 and head K is a maximum of 5 cm, preferably approximately 2 cm to 3 cm. Head support 1 is assigned a sensor device 10 to automatically ascertain these (vertical and horizontal) target positions. Sensor device 10 includes a capacitive proximity sensor 11. This proximity sensor 11 consists of three longitudinal electrode strips made of conductive, flexible material, which are integrated into head support 1 on the front thereof. These electrode strips are situated above each other in the parallel direction and at a distance from each other with regard to their longitudinal extension and include a lower transmitting electrode 12, an upper transmitting electrode 13 as well as a common receiving electrode 14 which is situated between the two transmitting electrodes 12 and 13 in the middle and at a distance therefrom.

Sensor device 10 furthermore includes a sensor control unit 15, which, in turn, is formed by a microcontroller or an ASIC and is preferably integrated into head support 1.

During operation of sensor device 10, sensor control unit 15 controls transmitting electrodes 12 and 13 by time-division multiplexing, i.e., alternating in time, with the aid of alternating voltages U1 and U2, respectively, on the basis of which transmitting electrodes 12 and 13 each generate an alternating electric field F1 and F2 in a space 16 situated in front of proximity sensor 11 (FIG. 2). The spatial progression of these alternating fields F1 and F2 is illustrated by the rough schematic representation in FIG. 2. According to FIG. 2, each transmitting electrode 12 and 13 forms a capacitor together with common receiving electrode 14, the capacitor being characterized by a capacitance C1 or C2. FIG. 2 furthermore shows that head K of the vehicle occupant sitting in the vehicle seat also acts to a certain extent as a counter-electrode to transmitting electrodes 12 and 13, due to the grounding effect of the human body, this effect always being present to a certain extent, and on the basis of this effect draws a portion of field F1 or F2 formed between each of transmitting electrodes 12 and 13 and receiving electrode 14. This reduces measurable capacitances C1 and C2 to a greater degree the closer head K comes to assigned transmitting electrode 12 or 13.

Sensor unit 10 uses this physical law to detect the position of the head relative to head support 1 and thus to ascertain the deviation of the instantaneous head support position from the assigned target position. Sensor control unit 15 detects receive signals E1 and E2 in the form of electric voltages and currents which are generated in receiving electrode 14 under the influence of alternating electric fields F1 and F2.

Sensor control unit 15 calculates the assigned capacitance C1 and C2 from receive signals E1 and E2, respectively, and ascertains therefrom a dimension for the vertical deviation of the instantaneous head support position from the vertical target position (hereinafter referred to as vertical deviation dimension $\Delta z$) as well as a dimension for the horizontal deviation of the instantaneous head support position from the horizontal target position (hereinafter referred to as horizontal deviation dimension $\Delta x$).

Sensor control unit 15 ascertains vertical deviation dimension $\Delta z$ on the basis of a formation of the difference between C1 and C2:

$$\Delta z = C1 - C2$$

Sensor control unit 15 ascertains horizontal deviation dimension $\Delta x$ on the basis of the sum of capacitances C1 and C2:

$$\Delta x = C1 + C2$$

Capacitances C1 and C2 and their deviation dimensions $\Delta z$ and $\Delta x$ are calculated numerically with the aid of control software stored in sensor control unit 15.

In an embodiment, sensor control unit 15 controls an optical and/or acoustic indication according to deviation dimensions $\Delta z$ and $\Delta x$, which enables the vehicle occupant to adjust head support 1 to the vertical and horizontal target positions by manually entering control commands.

In an embodiment illustrated in FIG. 1, sensor control unit 15 controls adjusting device 2 directly by transmitting deviation dimensions $\Delta z$ and $\Delta x$ to motor control unit 7. In addition, sensor control unit 15 transmits a detection signal S to motor control unit 7, which indicates the presence of head K in the detection field of proximity sensor 11. Detection signal S is transmitted if at least one of capacitances C1 and C2 drops below a predetermined threshold value.

Head support 1 is adjusted according to the following search method:

Motor control unit 7 first starts a vertical search run. For this purpose, motor control unit 7 moves head support 1 upward from an initial position in which head support 1 is located at the bottom stop of its adjustment path in vertical direction z and at the back stop of its adjustment path in horizontal direction x, by correspondingly actuating servomotor 3. During the search run, motor control unit 7 detects deviation dimension $\Delta z$ supplied by sensor control unit 15 continuously or at regular intervals and stops the vertical adjustment when deviation dimension $\Delta z$ reaches a value of zero within predetermined tolerances or changes signs, provided that sensor control unit 15 simultaneously receives detection signal S.

Conversely, if motor control unit 7 fails to receive detection signal S from sensor control unit 15 over the entire vertical adjustment path of head support 1, it moves head support 1 a predetermined distance forward by actuating servomotor 5 and repeats the vertical search run. If no head K is detectable over the entire vertical and horizontal adjusting range of head support 1, motor control unit 7 moves head support 1 to a predetermined default position (safety position), in particular a so-called ⅔ position in which head support 1 is set to a withdrawn position in horizontal direction x as well as a position which is extended to approximately ⅔ of its vertical adjustment path in vertical direction z.

Conversely, if sensor device 10 detects the presence of head K during the vertical search run, and motor control unit 7 has set head support 1 to the vertical target position accordingly, motor control unit 7 begins a horizontal search run during which it moves head support 1 forward in horizontal direction x by actuating servomotor 5. Motor control unit 7 detects deviation dimension $\Delta x$ and stops the head support adjustment if deviation dimension $\Delta x$ reaches or exceeds the associated threshold value.

In an exemplary embodiment of the search method, motor control unit 7 always begins the search run starting from the instantaneous head support position. Head support 1 is thus not first moved to the initial position described above. In addition, motor control unit 7 preferably carries out the horizontal and vertical search runs simultaneously. Head support 1 is thus moved to the target position over the shortest distance, i.e., by being adjusted in vertical direction z and horizontal direction x simultaneously, provided that sensor control unit 15 detects the presence of head K. If head K is not detected, motor control unit 7 first moves head support 1 upward in vertical direction z and then back down again, if necessary. If no head K is detected over the entire vertical adjustment path of head support 1, motor control unit 7 again moves head support 1 into the default position.

The search method described above can be carried out by default when the motor vehicle engine is started. During vehicle operation, it is optionally repeated at regular intervals and/or at the request of the vehicle occupant.

In alternative embodiments of the invention, motor control unit 7 and sensor control unit 15 may also be integrated into a common component, in particular a common microcontroller and, if necessary in a common software module. Furthermore, the sum and/or difference formation may also be carried out on the hardware level with the aid of electric circuits. In particular, the two transmitting electrodes 12 and 13 may be controlled for sum formation.

Proximity sensor 11 may also include more than two transmitting electrodes, for example four transmitting electrodes. In this case, a correspondingly larger number of receive signals or variables derived therefrom, in particular the capacitances derived from each of the receive signals, is carried out in the difference or sum formation.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sensor device for ascertaining a deviation of a position of a head support of a motor vehicle seat from a target position, the sensor device comprising:

- a capacitive proximity sensor that is integrateable into the head support, the capacitive proximity sensor including two transmitting electrodes that are disposed at a vertical distance from each other and a common receiving electrode; and
- a control unit configured to:
  - actuate the transmitting electrodes for transmitting an alternating electric field;
  - determine a dimension for a vertical and a horizontal deviation of the head support position from a predefined target position with respect to the position of a head of a vehicle occupant based on received signals that are detectable by the receiving electrode and contain an item of information about a capacitance formed between the transmitting electrodes and the receiving electrode;
  - determine the dimension of the vertical deviation of the head support position based on a difference between the received signals assigned to the two transmitting electrodes or variables derived therefrom; and
  - determine the dimension of the horizontal deviation of the head support position based on a sum of the received signals assigned to the two transmitting electrodes or variables derived therefrom.

2. The sensor device according to claim 1, wherein the control unit includes circuitry for forming the sum and/or difference.

3. The sensor device according to claim 1, wherein the control unit includes programming for forming the sum and/or difference.

* * * * *